United States Patent [19]

Gill

[11] Patent Number: 5,593,595

[45] Date of Patent: Jan. 14, 1997

[54] METHOD FOR CONTROLLING SCALE USING A SYNERGISTIC PHOSPHONATE COMBINATION

[75] Inventor: Jasbir S. Gill, McKees Rocks, Pa.

[73] Assignee: Calgon Corporation, Pittsburgh, Pa.

[21] Appl. No.: 540,270

[22] Filed: Oct. 6, 1995

[51] Int. Cl.⁶ .................................................. C02F 5/14
[52] U.S. Cl. .......................... 210/700; 210/701; 252/180; 252/389.22; 252/395; 422/15; 422/16; 422/17
[58] Field of Search ................................. 210/698–701; 252/180, 389.22, 395; 422/15–17

[56] References Cited

U.S. PATENT DOCUMENTS

| | | | |
|---|---|---|---|
| 2,358,222 | 9/1944 | Fink et al. | 210/697 |
| 2,539,305 | 1/1951 | Hatch | 210/697 |
| 2,783,200 | 2/1957 | Crum et al. | 210/701 |
| 2,917,528 | 12/1959 | Ramsey et al. | 210/700 |
| 2,964,549 | 12/1960 | Ramsey et al. | 260/438 |
| 2,980,610 | 4/1961 | Ruehrwein | 210/698 |
| 3,285,886 | 11/1966 | Gunderson et al. | 210/701 |
| 3,434,969 | 3/1969 | Ralston | 210/700 |
| 3,463,730 | 8/1969 | Booth et al. | 210/701 |
| 3,514,476 | 5/1970 | Morita | 260/429.9 |
| 3,518,204 | 6/1970 | Hansen et al. | 252/181 |
| 3,928,196 | 12/1975 | Persinski et al. | 210/701 |
| 3,965,027 | 6/1976 | Boffardi et al. | 210/701 |
| 3,976,589 | 8/1976 | Mitchell | 210/700 |
| 4,080,375 | 3/1978 | Quinlan | 210/700 |
| 4,330,487 | 5/1982 | Redmore et al. | 210/700 |
| 4,457,847 | 7/1984 | Lorenc et al. | 210/698 |
| 4,617,129 | 10/1986 | Lees | 210/700 |
| 4,618,448 | 10/1986 | Cha et al. | 252/180 |
| 4,640,793 | 2/1987 | Persinski et al. | 252/82 |
| 4,649,025 | 3/1987 | Hwa et al. | 422/15 |
| 4,650,591 | 3/1987 | Booth et al. | 210/700 |
| 4,671,888 | 6/1987 | Yorke | 252/180 |
| 4,689,200 | 8/1987 | Cook et al. | 422/15 |
| 4,872,996 | 10/1989 | Grierson et al. | 210/700 |
| 4,931,189 | 6/1990 | Dhawan et al. | 210/700 |
| 4,936,987 | 6/1990 | Persinski et al. | 210/699 |
| 4,963,267 | 10/1990 | Hoots et al. | 210/701 |
| 4,973,744 | 11/1990 | Hwa et al. | 210/700 |
| 4,977,292 | 12/1990 | Hwa et al. | 210/700 |
| 5,019,343 | 5/1991 | Hwa et al. | 422/16 |
| 5,051,532 | 9/1991 | Hwa et al. | 210/700 |
| 5,069,798 | 12/1991 | Hwa et al. | 210/700 |
| 5,087,376 | 2/1992 | Bendiksen et al. | 210/700 |
| 5,124,046 | 6/1992 | Sherwood et al. | 210/699 |
| 5,158,685 | 10/1992 | Freese | 210/699 |
| 5,262,061 | 11/1993 | Gill et al. | 210/700 |
| 5,300,231 | 4/1994 | Cha | 210/700 |
| 5,322,636 | 6/1994 | Schaper | 252/82 |
| 5,338,477 | 8/1994 | Chen et al. | 252/180 |
| 5,352,365 | 10/1994 | Fuller | 210/700 |
| 5,358,642 | 10/1994 | Chen et al. | 210/700 |
| 5,368,830 | 11/1994 | Alfano et al. | 252/180 |
| 5,378,368 | 1/1995 | Gill | 210/639 |
| 5,534,157 | 7/1996 | Iman et al. | 210/701 |

FOREIGN PATENT DOCUMENTS

| | | |
|---|---|---|
| 0384779 | 8/1990 | European Pat. Off. . |
| 0432664 | 6/1991 | European Pat. Off. . |
| 0437722 | 7/1991 | European Pat. Off. . |

OTHER PUBLICATIONS

Wayplex 61–A P. A. Hunt Chemical Corp.
Briquest 221–50A Albright & Wilson Technical Bulletin.

Primary Examiner—Peter A. Hruskoci
Attorney, Agent, or Firm—Craig G. Cochenour

[57] ABSTRACT

An aqueous system containing scale forming salts including both calcium carbonate and calcium phosphate and characterized by high pH and high calcite concentrations which further contains a synergistic effective amount of a combination comprising (A) a polyether polyamino methylene phosphonate, (B) a terpolymer comprising the monomers of acrylic acid, sulfophenomethallyl ether and maleic acid, and (C) a hydroxyphosphonoacetic acid, is disclosed. A method for inhibiting the formation, deposition and adherence of such scale forming salts in the aqueous system employing the synergistic combination is also provided.

18 Claims, No Drawings

METHOD FOR CONTROLLING SCALE USING A SYNERGISTIC PHOSPHONATE COMBINATION

BACKGROUND OF THE INVENTION

1. Field of the Invention

This invention relates to a synergistic combination comprising a polyether polyamino methylene phosphonate, a terpolymer comprising the monomers of acrylic acid, sulfophenomethallyl ether and maleic acid, and hydroxyphosphonoacetic acid for controlling the deposition of calcium carbonate and calcium phosphate scale deposits on the surfaces of an aqueous system.

2. Brief Description of the Background Art

Generally, calcium carbonate and calcium phosphate scale deposits are incrustation coatings which accumulate on the metallic or plastic surfaces of a water-carrying system through a number of different causes.

Various industrial and commercial water-carrying systems are subject to calcium carbonate and calcium phosphate scale formation problems. Calcium carbonate and calcium phosphate scales are of particular concern in heat exchange systems employing water, such as, for example, boiler systems and once-through and open recirculating water cooling systems. Cooling towers are especially significant, particularly where severe conditions including high pH and high calcite concentrations are encountered.

The water employed in these systems ordinarily will contain a number of dissolved salts, and the alkaline earth metal cation calcium is usually prevalent, as are the anions carbonate and phosphate. The combination products of calcium cation and carbonate anion and calcium cation and phosphate anion will precipitate from the water in which the ions are carried to form scale deposits when the concentrations of the anion and cation comprising the reaction product, i.e., calcium carbonate, or calcium phosphate, exceeds the solubility of the reaction product itself. Thus, when the concentration of calcium ion and anion exceed the solubility of the calcium reaction product, a solid phase of calcium carbonate and/or calcium phosphate will form as a precipitate. Precipitation of the reaction product will continue until the solubility product concentration of the constituent ions is no longer exceeded.

Numerous factors may be responsible for producing a condition of supersaturation for the reaction product. Among such factors are changes in the pH of the water system, evaporation of the water phase, rate of heat transfer, amount of dissolved solids, and changes in the temperature or pressure of the system.

For cooling systems and similar heat exchange systems, including cooling towers, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. Precipitation is also favored on the heat transfer surface because of the inverse solubility relationship of calcium carbonate. As a result, the solubility of the scale-forming calcium carbonate salt reaction product is first exceeded in this thin film, and crystallization of calcium carbonate scale results directly on the heating or heat exchange surface.

In addition to this, a common source of scale in boiler systems is the breakdown of calcium bicarbonate to form calcium carbonate, water and carbon dioxide under the influence of heat. For open recirculating cooling water systems, in which a cooling tower, spray pond, evaporative condenser, and the like serve to dissipate heat by evaporation of water, the chief factor which promotes calcium carbonate scale formation is concentration of solids dissolved in the water by repeated evaporation of portions of the water phase. Thus, even a water which is not scale forming on a once-through basis usually will become scale forming when concentrated two, four or six times. Moreover, alkalinity of the make-up water, with evaporative cycles over time results in an increasing alkalinity of the water in the overall system, often having pH's of 8.5–9.5 and even higher. Conventional scale inhibiting compositions typically fail in systems having such severe conditions.

The formation of calcium carbonate and calcium phosphate scale deposits poses a serious problem in a number of regards. The calcium scale which is formed possesses a low degree of heat conductivity. Thus, a calcium scale deposit is essentially an insulating layer imposed across the path of heat travel from whatever source to the water of the system. In the case of a cooling system, the retarded heat transfer causes a loss in cooling efficiency. Consequently, calcium scale is an expensive problem in many industrial water systems, causing delays and shutdowns for cleaning and removal.

Although the present invention is directed primarily to preventing or inhibiting the deposition of calcium carbonate and calcium phosphate scale, it is also applicable to inhibiting the deposition of other types of alkaline earth metal scales, especially those associated with calcium carbonate scale under the severe conditions described herein. For example, most industrial and commercial water contains alkaline earth metal cations, such as calcium and magnesium, etc., and several anions such as bicarbonate, carbonate, and phosphate. When combinations of these anions and cations are present in concentrations which exceed the solubility of their reaction products, precipitates form until their product solubility concentrations are no longer exceeded. These precipitates are alkaline earth metal scales. Thus, by alkaline earth metal scales is meant scales including but not limited to calcium carbonate, calcium phosphate and magnesium carbonate. These scales form frequently in the tubes of heat exchangers and on other heat exchange surfaces, such as those in cooling towers. Particular systems or applications areas where severe conditions lead to exceptional buildup of calcium carbonate and calcium phosphate scales, in addition to cycled up cooling towers, include reverse osmosis systems, sugar refining evaporators and certain types of gas scrubbers.

The synergistic combination of the present invention is used in amounts as threshold inhibitors to achieve calcium scale inhibition, rather than sequestering or chelating agents, although the combination of the present invention has dispersant properties as well and significantly reduces the adherency of any scale deposit which is formed, facilitating its easy removal.

Scale-forming compounds can be prevented from precipitating by inactivating their cations with chelating or sequestering agents, so that the solubility of their reaction products is not exceeded. Generally, this requires many times as much chelating or sequestering agent as cation, since chelation is a stoichiometric reaction; these amounts are not always desirable or economical. However, several decades ago, it was discovered that certain inorganic polyphosphates would prevent such precipitation when added in amounts far less than the concentrations needed for sequestering or chelating.

When a precipitation inhibitor is present in a potentially scale-forming aqueous system at a markedly lower concentration than that required for sequestering the scale-forming cation (stoichiometric), it is said to be present in "threshold" amounts. See, for example, Hatch and Rice, *Indust. Eng. Chem.* 31, 51–53 (1939); Reitemeier and Buehrer, *J. Phys. Chem.*, 44(5), 535–536 (1940); Fink and Richardson, U.S. Pat. No. 2,358,222; and Hatch, U.S. Pat. No. 2,539,305.

Similarly, anionic and cationic polymers can be used as dispersants in accordance with methods known in the art, but the dosage levels necessary to achieve dispersion are in the range of 0.5–1.0% by weight of the aqueous system being treated, which is many orders of magnitude higher than the dosage levels used for the combination of the present invention. Thus, it is a unique aspect of the present invention that it is possible to achieve essentially non-adherent scale using only threshold inhibitor dosage levels of the synergistic combinations of the present invention.

Recently, attention has been focused on controlling scaling under severe conditions, where conventional treatments such as those described above do not provide complete scale control for calcium carbonate and calcium phosphate. Current technology in scale control can be used to inhibit $CaCO_3$ scale up to 100 to 120 times calcite saturation, i.e., a water containing $Ca^{2+}$ and $CO_3^{2-}$ present at 100 times (100×) the solubility limit of calcium as calcite (calcite is the most common crystalline form of calcium carbonate). However, what is desired are inhibitors effective in greater than 100× water, where the calcite ions can be prevented from precipitating as calcium carbonate scale and also wherein the inhibitors are effective in inhibiting the formation of calcium phosphate scale as well, using substoichiometric amounts of an inhibitor. Further, the synergistic combinations of the present invention are especially useful under severe conditions characterized by a calcite saturation level of greater than 150× as defined in the paragraph immediately below, for the control of both calcium carbonate and calcium phosphate scales.

Severity of the scaling tendency of a water sample is measured using the saturation index, which may be derived in accordance with the following equation:

$$SI = \frac{[Ca^{2+}][CO_3^{2-}]}{K_{sp}CaCO_3}$$

where SI is the saturation index for calcium carbonate, $[Ca^{2+}]$ is the concentration of free calcium ions, $[CO_3^{2-}]$ is the concentration of free carbonate ions, $[CO_3^{2-}]$ is the concentration of free carbonate ions, and $K_{sp}CaCO_3$ is the conditional solubility product constant for $CaCO_3$. All of the quantities on the right side of the above equation are adjusted for pH, temperature and ionic strength.

Calculation and use of the saturation index, and generation of the data from which it is derived, are matters within the skill of the art. See, for example, *Critical Stability Constants*, Vol. 4: "Inorganic Complexes", Smith & Mantell (1976), Plenum Press; and *Aquatic Chemistry*, Chap. 5, 2nd ed., Stumm & Morgan (1981), Wiley & Sons.

Another characteristic feature of the severe conditions under which the scale controlling methods of the present invention are especially useful is high pH, greater than about 8.5. A related feature of such severe conditions is high alkalinity.

One of the particular advantages of the scale inhibiting combinations of the present invention is the exceptional calcium tolerances which they exhibit. Calcium tolerance is a measure of a chemical compound's ability to remain soluble in the presence of calcium ions $[Ca^2+]$. One of the parameters of scale control under severe conditions is pH.

As pH increases, calcium tolerance decreases rapidly for traditional $CaCO_3$ threshold inhibitors, e.g., 1-hydroxyethylidene-1,1-diphosphonic acid (HEDP) and amino tri(methylene phosphonic acid) (AMP). These inhibitors precipitate with calcium at alkaline pH's, rendering them useless as threshold scale inhibitors.

Early efforts to reduce scale formation in water-carrying systems employed compounds such as tannins, modified lignins, algins, and other similar materials. Chelating or sequestering agents have also been employed to prevent precipitation or crystallization of scale-forming calcium carbonate. Another type of agent which has been actively explored heretobefore as a calcium carbonate scale inhibiting material is the threshold active inhibitor. Such materials are effective as scale inhibitors in amounts considerably less than stoichiometrically required, and this amount, as already mentioned, is termed the threshold amount. Inorganic polyphosphates have long been used as such threshold active inhibitors. For examples of such materials, see Fink—U.S. Pat. No. 2,358,222; Hatch—U.S. Pat. No. 2,539,305; and Ralston—U.S. Pat. No. 3,434,969. Certain water soluble polymers, including groups derived from acrylamide and acrylic acid have been used to condition water containing scale-forming calcium carbonate. For example, See U.S. Pat. Nos. 2,783,200; 3,514,476; 2,980,610; 3,285,886; 3,463,730; 3,518,204; 3,928,196; 3,965,017; and 4,936,987. In particular, there has been employed anionic polyelectrolytes such as polyacrylates, polymaleic anhydrides, copolymers of acrylates and sulfonates, and polymers of sulfonated styrenes. See, for example, U.S. Pat. No. 4,640,793; 4,650,793; 4,650,591; 4,457,847; and 4,671,888. However, when used as threshold alkaline earth metal scale inhibitors, large dosages of these polymers are required, which in turn increases operating costs.

While polyether polyamino methylene phosphonates of the type that comprises one element of the synergistic combination of the instant invention, are known for their use for the control of alkaline earth metal scale having severe conditions wherein the pH is at least 8.5 and the calcite saturation is at least 150 times the solubility limit of calcium as calcite, U.S. Pat. Nos. 5,338,477 and 5,353,642, the aqueous system having the synergistic combination of the instant invention has not heretobefore been suggested. Further, as demonstrated herein, use of the polyether polyamino methylene phosphonates alone for the control of alkaline earth metal scales such as calcium carbonate and calcium phosphate simultaneously require large dosages making the use of the polyether polyamino methylene phosphonate alone expensive and therefore increasing operating costs to an unacceptable level.

In spite of this background material, there remains a very real and substantial need for a synergistic combination and a method of inhibiting the formation, deposition and adherence of scale forming salts in an aqueous system, such as for example, but not limited to, a cooling tower.

SUMMARY OF THE INVENTION

The present invention has met the above-described needs. The present invention relates to an aqueous system containing scale forming salts and characterized by high pH and high calcite concentrations wherein the pH is at least 8.5 and the calcite saturation level is at least 100 times the solubility limit of calcium as calcite, which further contains a synergistic effective amount of a combination comprising: (A) a polyether polyamino methylene phosphonate of the formula:

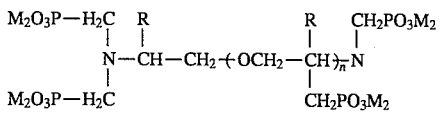

where n is an integer or fractional integer which is, or on average is, from about 2 to about 12, inclusive; M is hydrogen or a cation of an alkali metal salt; and each R may be the same or different and is independently selected from hydrogen and methyl; (B) a terpolymer comprising the monomers of acrylic acid, sulfophenomethallyl ether and maleic acid, wherein the weight average molecular weight for said terpolymer is in the range from about 4,000 to 10,000; and (C) a hydroxyphosphonoacetic acid. Preferably, the combination includes wherein for the polyether polyamino methylene phosphonate, M is hydrogen, each R is methyl, and n is about 2 to 4, and more preferably wherein n is an average of about 2.6. The aqueous system of the present invention as described herein includes wherein the weight ratio of (A) polyether polyamino methylene phosphonate: (B) terpolymer: (C) hydroxyphosphonoacetic acid ranges from about 1:2:1 to about 5:2:1.

In a preferred embodiment of this invention, the aqueous system as described herein is provided wherein the terpolymer (B) is about 84 weight average molecular weight percent acrylic acid, about 8.0 weight average molecular weight percent sulfophenomethallyl ether, and about 8.0 weight average molecular weight percent maleic acid.

In another embodiment of this invention, the aqueous system as described herein is provided wherein the aqueous system additionally includes a stabilizer for preventing decomposition of the (A) polyether polyamino methylene phosphonate.

In yet another embodiment of this invention, the aqueous system as described herein is provided wherein the aqueous system additionally includes a corrosion inhibitor. The corrosion inhibitor is, such as for example, but not limited to a steel and/or copper corrosion inhibitor(s).

Another embodiment of this invention, provides an aqueous system containing scale forming salts and characterized by high pH and high calcite concentrations wherein the pH is at least 8.5 and the calcite saturation level is at least 100 times the solubility limit of calcium as calcite, which further contains a synergistic effective amount of a combination comprising: (A) a polyether polyamino methylene phosphonate of the formula:

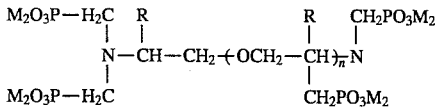

where n is an integer or fractional integer which is, or on average is, from about 2 to about 12, inclusive; M is hydrogen or a cation of an alkali metal salt; and each R may be the same or different and is independently selected from hydrogen and methyl; (B) a composition comprising a mixture of polymaleic acid and a copolymer of acrylic acid and sulfophenomethallyl ether wherein the weight ratio of acrylic acid: sulfophenomethallyl ether of said copolymer ranges from about 3:1 to 18:1, and wherein said composition has a weight average molecular weight ranging from about 4,000 to 10,000; and (C) a hydroxyphosphonoacetic acid.

In yet another embodiment of this invention a method is provided for inhibiting the formation, deposition and adherence of scale forming salts in an aqueous system having a pH of at least 8.5 and a calcite saturation level of at least 100 times the solubility limit of calcium as calcite, comprising adding to said aqueous system an effective synergistic amount of a combination of (A) an amount to establish a concentration of at least about 1.0 mg/L, of the formula:

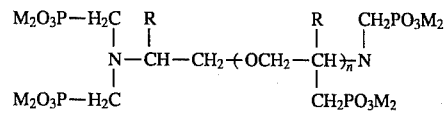

where n is an integer or fractional integer which is, or on average is, from about 2 to about 12, inclusive; M is hydrogen or a cation of an alkali metal salt; and each R may be the same or different and is independently selected from hydrogen and methyl; (B) an amount sufficient to establish a concentration of at least about 2.0 mg/L of a terpolymer comprising the monomers of acrylic acid, sulfophenomethallyl ether and maleic acid, wherein said terpolymer has a weight average molecular weight in the range from about 4,000 to 10,000; and (C) an amount sufficient to establish a concentration of at least about 1.0 mg/L of a hydroxyphosphonoacetic acid.

In a preferred embodiment of this invention, the method as described herein includes adding a stabilizer to the aqueous system as described herein.

In another preferred embodiment of this invention, the method as described herein includes adding at least one corrosion inhibitor to the aqueous system as described herein.

Another embodiment of this invention provides a method of inhibiting the formation, deposition and adherence of scale forming salts in an aqueous system having a pH of at least 8.5 and a calcite saturation level of at least 100 times the solubility limit of calcium as calcite, comprising adding to said aqueous system an effective synergistic amount of a combination of (A) an amount to establish a concentration of at least about 1.0 mg/L, of the formula:

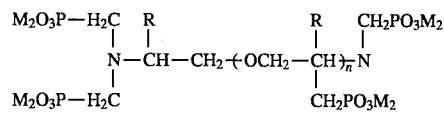

wherein n is an integer or fractional integer which is, or on average is, from about 2 to about 12, inclusive; M is hydrogen or a cation of an alkali metal salt; and each R may be the same or different and is independently selected from hydrogen and methyl; (B) an amount sufficient to establish a concentration of at least 2.0 mg/L of a composition comprising a mixture of polymaleic acid and a copolymer of acrylic acid and sulfophenomethallyl ether wherein the weight of acrylic acid:sulfophenomethallyl ether of said copolymer ranges from about 3:1 to 18:1, and wherein said composition has a weight average molecular weight ranging from about 4,000 to 10,000; and (C) an amount sufficient to establish a concentration of at least about 1.0 mg/L of a hydroxyphosphonoacetic acid. Another embodiment of this invention provides the method as described herein which further includes adding one or both of a stabilizer to the aqueous system for preventing decomposition of the polyether polyamino methylene phosphonate and at least one corrosion inhibitor.

DETAILED DESCRIPTION OF THE INVENTION

The instant invention is directed to an aqueous system containing scale forming salts and a synergistic effective amount of a combination as set forth herein, and a method of inhibiting the formation, deposition, and adherence of scale forming salts in the aqueous system.

As used herein the phrases "inhibiting the precipitation" and "inhibiting the deposition" include threshold inhibition, dispersion, solubilization, or particle size reduction. The phrase "inhibiting the adherence" and "increasing the non-adherence", define the formation of a scale deposit which is easily removed, e.g., by simple rinsing, i.e., a scale deposit which is not so firmly bonded to the surface to which it is attached that it cannot be removed by simple physical means as opposed to harsh mechanical or chemical treatment.

As used herein, the phrase "scale-forming salts" includes any of the scale-forming salts, including, but not limited to, calcium carbonate, calcium sulfate, calcium phosphate, calcium phosphonate (including calcium hydroxyethylidene diphosphonic acid), calcium oxalate, calcium fluoride, barium sulfate and magnesium salts.

As used herein, the phrase "aqueous system" refers to commercial or industrial system utilizing water and involving heat exchange surfaces, usually of metal, including, but not limited to, cooling water systems, especially cooling towers, boiler water systems, desalination systems, gas scrubbers and thermal conditioning equipment. Of particular importance are those systems which operate under severe conditions as detailed herein, including high pH and high calcite concentrations. Typical of such systems are cycled up cooling towers, reverse osmosis systems, sugar refining evaporators and gas scrubbers.

The present invention provides an aqueous system containing scale forming salts and characterized by high pH and high calcite concentrations wherein the pH is at least 8.5 and the calcite saturation level is at least 100 times the solubility limit of calcium as calcite, which further contains a synergistic effective amount of a combination comprising: (A) a polyether polyamino methylene phosphonate of the formula:

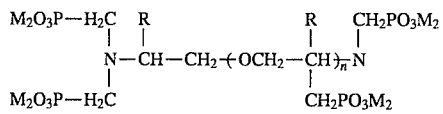

where n is an integer or fractional integer which is, or on average is, from about 2 to about 12, inclusive; M is hydrogen or a cation of an alkali metal salt; and each R may be the same or different and is independently selected from hydrogen and methyl; (B) a terpolymer comprising the monomers of acrylic acid, sulfophenomethallyl ether and maleic acid, wherein the weight average molecular weight for said terpolymer is in the range from about 4,000 to 10,000; and (C) a hydroxyphosphonoacetic acid.

Preferably, the aqueous system includes wherein for the (A) polyether polyamino methylene phosphonate of the formula described hereinabove, the M is hydrogen, R is methyl, and n is from about 2 to 3, and most preferably an average of about 2.6.

In order to obtain high levels of control of scale deposits, especially under the severe conditions defined herein, it has been found that there are certain essential components of the structure of the polyether polyamino methylene phosphonate (A) of the present invention which are necessary to provide that performance. Thus, e.g., the tetra(aminophosphonate) portion of the structure is essential. Whether these groups are present initially in the phosphonic acid form or as an alkali metal or other salt of the acid, has no real bearing on the performance of the overall molecule. At the pH's under which the compositions of the present invention function, they are, and must be, in their ionized form. Thus, it is not critical whether "M" is hydrogen or a suitable cation, and the selection of an appropriate salt form is well within the skill of the art. In addition to alkali metal salts, ammonium salts: $NH_4^+$, or ammonium derivative salts: $NR_4^+$ (R=alkyl etc.), or mixtures thereof, may be used. Alkali metal salts are the most simple, and are preferred for that reason.

A desirable, although not essential structural feature of the (A) polyether polyamino methylene phosphonates useful in the aqueous system and methods of the present invention is the isopropyl group which bridges the diphosphonomethylamino group and the polyether group:

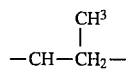

The isopropyl group has been found to provide enhanced scale inhibition activity under the severe conditions defined herein.

The next structural element of the polyether polyamino phosphonates to be considered is the polyether moiety:

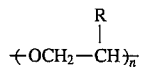

R may be hydrogen or methyl, and thus the polyether moiety is either polyoxyethylene or polyoxypropylene, with the polyoxypropylene being preferred. Since the polyether polyamino methylene phosphonates are prepared by phosphonomethylation of the appropriate diamine, the character of the polyether moiety will depend upon the way in which the amine starting material is made. Processes for making such polyether diamines are known in the art; and attention is directed particularly to U.S. Pat. No. 3,236,895, which describes preparation of a variety of polyether diamines especially useful in preparing the phosphonate final products (A), as described herein, used in synergistic combination as deposit control agents in the present invention.

In accordance with the processes set out in U.S. Pat. No. 3,236,895 and related processes described in the prior art, it is possible to prepare any one of a number of desired polyether diamines within the scope of the present invention. In the general formula for the (A) polyether polyamino methylene phosphonates used herein, the polyether moiety is simply represented by the formula above. Since R may be hydrogen or methyl, both ethyleneoxy and propyleneoxy units are possible, as already mentioned. Moreover, R is to be independently chosen, i.e., ethyleneoxy and propyleneoxy units may alternate in various patterns, including blocks of each, or they may be all one or the other. For example, the following are just some of the polyether segments which might be prepared to form the basis for the corresponding diamines, which would then be used to make phosphonates within the scope of the present invention (where EO=ethyleneoxy, and PO=propyleneoxy):

---

EO:PO; EO—EO; PO—PO; EO—PO; EO—EO—EO;
PO—PO—PO; EO—EO—PO; EO—PO—PO; EO—PO—EO;
PO—EO—PO; EO—EO—EO—EO; PO—PO—PO—PO;
EO—PO—PO—PO; EO—EO—PO—PO; EO—EO—EO—PO;
EO—PO—EO—PO; EO—PO—PO—EO; PO—EO—EO—PO

---

In the above examples, "n" in the main formula would be an integer of from 1–4. Since "n" is defined as being from 1 to 12, an even larger number of possible polyether moieties is included. However, it has been found that generally the polyether polyamino methylene phosphonates of lower molecular weight, i.e., where "n" is a smaller integer, are those which provide the greatest amount of scale inhibition under the severe conditions of high pH and high calcite concentration, and thus are those which are preferred. Examples of some of these preferred phosphonates are shown in the table below, where Z=methylenephosphonate:

$$Z_2-N-CHCH_2-(OCH_2CH)_a-(OCH_2CH)_b-NZ_2$$
with substituents $R_z$, $R_a$, $R_b$ on successive carbons.

| Id. No. | a | b | $R_z$ | $R_a$ | $R_b$ |
|---|---|---|---|---|---|
| A | 2 | 1 | $CH_3$ | H | $CH_3$ |
| B | 2.6* | 0 | $CH_3$ | $CH_3$ | — |
| C | 2 | 0 | $CH_3$ | $CH_3$ | — |
| D | 8.5* | 1 | $CH_3$ | H | $CH_3$ |
| E | 5.6* | 0 | $CH_3$ | $CH_3$ | — |
| F | 2 | 0 | H | H | — |
| G | 3 | 0 | H | H | — |
| H | 3 | 0 | $CH_3$ | $CH_3$ | — |
| I | 3 | 1 | H | $CH_3$ | H |
| J | 4 | 0 | H | $CH_3$ | — |

* = the value of "n" on average.

It will be noted from the table above that in several cases, "n" has an average value, i.e., the number of repeating ethyleneoxy or propyleneoxy units may vary. Thus, it is possible to have a mixture of varying chain lengths of polyoxyethylene or polyoxypropylene in the final product. This is also contemplated to be within the scope of the present invention, so long as the requirements with respect to the limit of "n" are observed. Consequently, while "n" is merely defined as an integer or fractional integer which is, or on average is, from about 2 to 12, it has two aspects. It defines the total of the number of repeating ethyleneoxy and/or propyleneoxy units considered separately, and thus if "n" is, e.g., 4, it includes 4 propyleneoxy units, 3 propyleneoxy units and 1 ethyleneoxy units, 2 propylenoxy units and 2 ethyleneoxy units, and so forth. The value of "n" may also represent an average number, and this is always the case, of course, when it is a fractional integer. In this case, for each of the ethylenoxy and/or propyleneoxy units considered separately, mixtures of these units may be present so as to give an average value for "n". For example, in the table above, for Id. No. D, the total of "a" and "b" is 9.5, which is the value of "n". What is described is a mixture of polyether phosphonates in which all of them have an isopropyl bridging group and an ethyleneoxy moiety, but the repeating propyleneoxy units are such that on average their value is about 8.5.

The number of repeating ethyleneoxy or oxypropylene units, designated by the subscript "n", determines the total molecular weight of the overall(A) polyether polyamino methylene phosphonate, and thus plays a critical role in determining the scale inhibiting performance of that phosphonate. It has been found that in order to provide adequate scale control using the synergistic combination of the present invention under the severe conditions of use defined herein, it is necessary that for the (A) polyether polyamino methylene phosphonate "n" be an integer or fractional integer which is, or on average is, from about 2 to about 12, inclusive.

As discussed above, the reason for "n" being potentially a fractional integer arises from the fact that the primary diamine from which the polyether polyamino methylene phosphonates are prepared by phosphonomethylation may be a mixture of polyethers in which "n" is two or more of 2, 3, 4, 5 and so forth, in varying proportions. For example, a preferred polyether polyamino methylene phosphonate for use in the aqueous system and methods of the present invention has a molecular weight of approximately 632 and the value of "n" on average is about 2.6. Thus, this type of polyether phosphonate has a molecular weight distribution, i.e., of the various polyoxypropylenes which make it up, and this distribution is represented by a fractional integer average value for "n". But, it is also within the scope of the present invention for "n" to be a whole integer, e.g., "3", which usually designates a single molecular weight and not a molecular weight distribution.

The (A) polyether polyamino methylene phosphonates of the synergistic combination of the aqueous system and methods of the present invention are prepared first by phosphonomethylation of the appropriate primary diamine which already contains the polyoxyethylene and polyoxypropylene moieties.

Such primary amine starting materials and their method of preparation are well known. The phosphonomethylation of the primary diamine is then carried out by a Mannich reaction such as that described in K. Moedritzer and R. Irani, *J. Organic Chem.* 31(5) 1603–7, "The Direct Synthesis of alpha-Aminomethyl Phosphonic Acids; Mannich-Type Reactions with Orthophosphorous Acid", May 1966. In a typical reaction, the primary diamine is added to a mixture of phosphorous acid and water, and concentrated hydrochloric acid is then added slowly, after which the reaction mixture is heated to reflux with addition of aqueous formaldehyde.

Although the general structural formula employed herein indicates that the nitrogen atom is completely phosphonomethylated, as a practical matter, preparation of the polyether polyamino methylene phosphonates of the present invention, as described in detail further below, usually results in only about 80 to 90% phosphonomethylation. Other side products give N-substitution with H, $CH_3$, $CH_2OH$, etc. It is not practical, as a matter of simple production economics, however, to isolate and purify the completely phosphonomethylated compounds, since the side products just described do not interfere with scale deposit inhibition. Such side products, are consequently, usually allowed to remain, and the test data set out further below is based on test samples containing such side products. Consequently, the activity levels obtained would be even higher were 100% active compound being tested.

Preparation of the preferred (A) polyether polyamino methylene phosphonate, N,N,N',N'-tetramethylene phosphono polyoxypropylene diamine, is set forth below.

A diamine having an average molecular weight of about 230 and having the structural formula: $H_2NCH(CH_3)$—$CH_2$—$[-OCH_2CH(CH_3)-]_{2.6}$—$NH_2$ (56.2 g) was added to a mixture of phosphorous acid (82 g) and deionized water (65 g) in a one liter resin flask fitted with a condenser, a Teflon® (DuPont) stirrer, a thermometer and an addition funnel. It is important to maintain as low a level of iron (Fe) in the reaction mixture as possible, and the most likely source of Fe is the phosphorous acid. The Fe interferes somewhat with the reaction, and consequently a low Fe content phosphorous acid is employed.

There was then added slowly to the reaction mixture 50 mL of concentrated HCl. The reaction mixture was subsequently heated to reflux (107° C). The temperature should be at least 95° C., but the best results are obtained when the reaction mixture is heated to reflux. After the reaction mixture reached reflux, there was added 150 g of 37% aqueous HCHO, which was added dropwise over a period of about 45 min. In order to obtain the best results, the ratio of HCHO to diamine starting material should be at least 4:1 on a molar basis, and preferably somewhat higher, as was the case in this synthesis.

The reaction mixture was then refluxed for an additional period of 3 hrs. While the reaction time depends upon temperature, best results are obtained by refluxing for at least ½ hr., preferably 2 to 3 hrs.

The reaction mixture was then cooled, and 97.2 g of volatiles were stripped off at 50° C. using a rotary evaporator. A total of 303.4 g of product was obtained, with a theoretical activity of 48%. $P_{31}$NMR indicated that at least about 85% of the —NH groups has been phosphonomethylated. Impurities included unreacted phosphorous acid, formaldehyde, phosphoric acid, methanolphosphonic acid, and other unidentified phosphorous compounds.

It has been found that the scale control performance of the polyether polyamino methylene phosphonates of the present invention depends to some extent, although not a very significant extent, on the variations in the process parameters described above. Best results are obtained, consequently, by employing the optimum conditions as outlined above.

When any of the (A) polyether polyamino methylene phosphonates of the present invention are used as described in the synergistic combination to inhibit the precipitation deposition, deposition, and adherence of scale-forming salts in the aqueous system, they can be effectively employed for that purpose when added in amounts sufficient to establish a concentration in the aqueous system of from about 1 to 100 mg/L. Preferably, the amount added will be sufficient to establish a concentration of at least about 6.0 mg/L when the aqueous system has a calcite saturation level of at least 150× as described herein. It is understood, however, that many factors, of the type which have been explained in detail with regard to the background to the present invention, will determine the actual amount of the polyether polyamino methylene phosphonate compositions of the synergistic combination of the present invention which will be added to any particular aqueous system in order to achieve the maximum amount of inhibition of alkaline earth metal, particularly, for example, calcium carbonate scale and calcium phosphate scale formation, deposition and adherence in that aqueous system. The calculation of those amounts is well within the skill of the artisan skilled in this art.

The (B) terpolymer component of the synergistic combination of the aqueous system comprises the monomers of acrylic acid, sulfophenomethallyl ether and maleic acid. The weight average molecular weight for this terpolymer is in the range from about 4,000 to 10,000.

In a preferred embodiment of the aqueous system of the present invention, the synergistic combination as described herein includes wherein the (B) terpolymer is about 84 weight average molecular weight percent acrylic acid, about 8 weight average molecular weight percent sulfophenomethallyl ether, and about 8 weight average molecular weight percent maleic acid.

The terpolymer (B) as described herein is present in the aqueous system as described herein, to establish a concentration of at least about 2.0 mg/L, and preferably from about 2.0 mg/L to about 50 mg/L. More preferably, the terpolymer (B) is present in the aqueous system to establish a concentration of at least about 4.0 mg/L, and most preferably from about 4 mg/L to 25 mg/L.

The terpolymer (B) described herein may be prepared by conventional methods known by those skilled in the art, and is commercially available from Alco Chemical, Chattanooga, Tenn., U.S.A. as "AR540" composition. "AR540" is a trademark of Alco Chemical.

For example, the (B) terpolymer, as described herein may be prepared by slowly adding acrylic acid monomer to an aqueous mixture containing maleic acid and sulfophenomethallyl ether. The aqueous mixture further contains an initiator, such as, for example, either sodium hypophosphite or sodium persulfate. The aqueous mixture is then refluxed for several hours from about 90° to 105° Centigrade. The molecular weight may be controlled by adding a chain terminator such as, for example, mercaptan or ispropranol. Thereafter, a caustic such as, for example, an ammonium salt may be added to partially neutralize the acid. It is within the skill of those skilled in the art to employ sufficient amounts of the above starting materials to prepare the (B) terpolymer, as described herein, of the instant invention.

The (C) hydroxyphosphonoacetic acid component of the synergistic combination of the aqueous system, as described herein, is present in the aqueous system to establish a concentration of at least about 1.0 mg/L, preferably from about 1.0 mg/L to 15 mg/L, and more preferably from about 2 mg/L to 10 mg/L. The hydroxyphosphonoacetic acid (C) may be prepared by conventional methods known by those skilled in the art, and is commercially available from FMC Corporation, Princeton, N.J. as "Belcor 575" composition. "Belcor 575" is a trademark of FMC Corporation.

For example, the (C) hydroxyphosphonoacetic acid, as described herein, is prepared by reacting sodium hypophosphite with glyoxylic acid or pyruvic acid, respectively, in an aqueous medium, such as, for example, distilled water. The reaction is carried out at elevated temperature, such as, for example, from about 60° to 110° Centigrade in the aqueous reaction medium, under reflux conditions. The reaction is held at this reflux temperature and the progress of the reaction is monitored by $P^{31}$ NMR analysis. The reaction is stopped after 9 hours. It is within the skill of those skilled in the art to employ sufficient amounts of the above starting materials to prepare the (C) hydroxyphosphonoacetic acid, as described herein, of the present invention.

In a preferred embodiment of the aqueous system of the present invention, as described herein, the weight ratio of the combination as described herein, comprising (A) polyether polyamino methylene phosphonate:(B) terpolymer: (C) hydroxyphosphonoacetic acid ranges from about 1:2:1 to about 5:2:1.

Thus, it will be appreciated by those skilled in the art that the synergistic combination (A), (B), and (C) of the aqueous system of the present invention can increase the amount of scale control and deposit control achieved under the severe conditions described herein more economically than was previously achieved heretobefore.

In addition to the synergistic combination of (A), (B), and (C) of the aqueous system, described herein, other additives may be used in further combination which increases the effectiveness of the synergistic combination (A), (B), and (C) as described herein. Thus, it is desirable to use one or more corrosion inhibitors along with the synergistic combination of the present invention in order to obtain corrosion rates which are acceptable. These corrosion inhibitors, as further described herein, may be steel and/or copper corrosion inhibitors. Acceptable corrosion rates depend on the circumstances surrounding each particular use environment, but will usually depend to a large degree on expectations with regard to the life expectancy of the equipment present in said environment. Also, acceptable corrosion almost always implies an absence of pitting attack type corrosion. The nature of the equipment involved will depend on the application area, but usually the metals from which such equipment is constructed and which are subject to corrosive attack are, for example, steel in its various common forms, including stainless steel, and copper itself or various alloys thereof, particularly brass. All of these metals are subject to corrosive attack, which, under the severe conditions of use of the aqueous systems and methods of the present invention, may be even greater than the extent of corrosive attack that is experienced under more normal conditions; and, therefore, all of these metals, therefore, will benefit from the use of one or more corrosion inhibitors in conjunction with the synergistic combination (A), (B), and (C) of the present invention.

With regard to corrosion inhibitors for steel and its alloys, it has been found that, surprisingly, not all corrosion inhibitors, including those which perform well with known phosphonate scale inhibitors used in the prior art, and might, therefore, be expected to provide adequate protection, are suitable for use with the synergistic combination of the aqueous system of the present invention. For example, it has been found that the molybdate and nitrite classes of corrosion inhibitors, which usually provide good corrosion protection, especially against pitting attack type corrosion, are not suitable for use with the (A) polyether polyamino methylene phosphonate of the synergistic combination of the present invention.

On the other hand, there are numerous steel corrosion inhibitors which are suitable, and such suitability can be readily determined by those skilled in the art. Thus it is within the ordinary skill of the artisan to determine which steel corrosion inhibitors would be suitable, and all such inhibitors are contemplated to be a part of the present invention. Having carried out the test procedures referred to above, it has been determined that one of the following steel corrosion inhibitors provide adequate levels of corrosion protection, including protection against pitting attack type corrosion, when used in combination with the synergistic combination of the aqueous system of the present invention:

hexametaphosphate,
orthophosphate,
pyrophosphate,
2-phosphonobutane-1,2,4-tricarboxylic acid (PBTC),
manganese [$Mn(II)^{+2}$], and
zinc [$Zn(II)^{+2}$].

The concentration of the steel corrosion inhibitor(s) which is required to provide adequate protection against corrosion will depend on the makeup of the water in the aqueous system being treated, the pH, and the temperature. Generally, however, the desired concentration of the preferred inhibitors recited above will be in the range of from about 0.1 mg/L to about 100 mg/L, preferably from about 1 mg/L to about 25 mg/L, and most preferably from about 1 mg/L to about 10 mg/L.

With regard to corrosion inhibitors for copper and its alloys, again those skilled in the art can readily determine which copper corrosion inhibitors are suitable. For example, following are suitable copper corrosion inhibitors for use with the aqueous system described herein of the present invention:

benzotriazole,
tolyltriazole,
2-mercaptobenzothiazole,
combinations of tolyltriazole and mercaptobenzothiazole as described in U.S. Pat. No. 4,675,158,
higher alkylbenzotriazoles of the type described in EP-A-0 397 454, and combinations thereof as described in EP-A-0 462 809,
alkoxybenzotriazoles and combinations thereof as described in EP-A-0 478 247, and
phenyl mercaptotetrazole and combinations thereof as described in EP-A-0 462 666.

The concentration of the desired copper corrosion inhibitor which should be used will depend not only on the inhibitor itself, but on such factors as the yellow metal surface area and total aqueous system volume, the concentration of dissolved and suspended copper, the pH, dissolved solids, and temperature. Generally, however, suitable copper corrosion inhibitors will be added in a range of concentrations from about 0.1 to about 100 mg/L, preferably from about 0.5 to about 20 mg/L and most preferably from about 1 to about 5 mg/L.

Further, it will be appreciated by those skilled in the art, that other additives may be added to the synergistic combination of the aqueous system, such as for example, a stabilizer for preventing decomposition of component (A) polyether polyamino methylene phosphonate of the synergistic combination of the aqueous system of the present invention. It will be understood by those skilled in the art that decomposition of deposit control agents may occur, for example, in the presence of biocide compositions containing, for example, chlorine, bromine or mixtures thereof. It is also known by those persons skilled in the art that aqueous systems commonly contain biocide compositions for biologic control. Examples of a suitable stabilizer that may be added to the aqueous system of the present invention include, but are not limited to, monoethanolamine and an organic sulfonamide comprising the compound of the formula

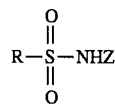

wherein:

Z is selected from hydrogen; and alkali and alkaline earth metal salt-forming ions; and
R is selected from the group consisting essentially of:

a) $C_{1-4}$ alkoxy radical: —$OC_{1-4}$alkyl;

b) an amino group, or a mono($C_{1-4}$alkyl)amino or di($C_{1-4}$alkyl)amino group: —$N(R^1)R^2$, where $R^1$ and $R^2$ are as defined above;

c) a formylamino group: —NHC(O)H;

d) ($C_{1-4}$alkyl) carbonylamino radical: —NH—C(O)$C_{1-4}$alkyl;

e) ($C_{1-4}$alkoxy) carboylamino radical: —NH—C(O)O$C_{1-4}$alkyl;

f) $C_{2-6}$alkenyl radical;

g) $C_{2-6}$alkynyl radical;

h) $C_{3-7}$cycloalkyl radical;

i) aryl or heteroaryl selected from the group consisting essentially of phenyl, naphthyl, pyridyl, pyrimidyl, pyrazyl, pyridazyl, pyrrolyl; imidazolyl, pyrazolyl, triazolyl, tetrazolyl; wherein the aryl and carbon atoms of the heteroaryl are optionally substituted with up to three radicals selected from the group consisting essentially of: $C_{1-4}$alkyl, $C_{1-4}$alkoxy, $C_{1-4}$alkoxycarbonyl; halo; nitro; nitrillo; carboxy; $C_{1-4}$alkylsulfonyl radical:

—$S(O)_nC_{1-4}$alkyl, where n=2; and a sulfamolyl group which is unsubstituted or substituted on the nitrogen by one or two $C_{1-4}$alkyl group: $SO_2N(R^1)R^2$, where $R^1$ and $R^2$ are as defined above; and wherein the nitrogen atom(s) of the heteroaryl is (are) optionally substituted by $C_{1-4}$alkyl of $C_{1-4}$alkylsulfonyl radical: —$S(O)_nC_{1-4}$alkyl, where n=2;

j) $C_{1-4}$alkyl radical; and k) $C_{1-4}$alkyl monosubstituted by one of the substituents a) through i) above.

Preferred organic sulfonamide stabilizing agents for use in the present invention are those set out above wherein R is:

$C_{1-4}$alkoxy radical: —$OC_{1-4}$alkyl;

an amino group, or a mono ($C_{1-4}$alkyl)amino or di($C_{1-4}$alkyl)amino group: —$N(R^1)R^2$, where $R^1$ and $R^2$ are independently H or $C_{1-4}$alkyl;

phenyl mono-substituted by $C_{1-4}$alkyl, $C_{1-4}$alkoxy, or —$SO_2N(R^1)R^2$, where $R^1$ and $R^2$ are as defined above;

$C_{1-4}$alkyl radical; or $C_{1-4}$alkyl monosubstituted by one of the substituents set out immediately above.

An especially preferred class of organic sulfonamides useful in the present invention is that wherein R is phenyl monosubstituted by $C_{1-4}$alkyl, and more particularly, para-substituted by methyl.

The organic sulfonamides described above are, for the most part, known in the art, and methods for their preparation are well known. One satisfactory approach to preparation of these compounds is by sulfonation of the appropriate amine with sulfur trioxide: $SO_3$. Another synthetic approach which may be used to prepare the organic sulfonamide stabilizers of the present invention is by treating ammonia, a primary amine, or a secondary amine with a sulfonyl chloride in the presence of some base. These and other methods are described in *Comprehensive Organic Chemistry: the Synthesis and Reactions of Organic Compounds*, Vol. 3, pp. 345–346, Derek Barton and W. David Ollis, eds., Pergamon Press 1979, as well as the literature references cited therein.

The overall amount, and particularly the concentration of organic sulfonamide stabilizing agent which must be employed in the aqueous system and methods of the present invention for inhibiting the degradation of the (A) polyether polyamino methylene phosphonate of the synergistic combination of the present invention depends on a number of factors, including especially pH, concentration of the chlorine and/or bromine biocide, and temperature and organic and inorganic constituents of the water which makes up the aqueous system being treated. With regard particularly to the concentration of the chlorine and/or bromine biocide in the aqueous system, it is desirable that the corresponding concentration of the organic sulfonamides stabilizing agent be in an equivalent weight ratio thereto (sulfonamide:halogen) of from about 0.5 to 2.0, preferably from about 0.75 to 1.25, and most preferably about 1.0. In general terms, the concentration of the organic sulfonamide will be from 0.1 to 100 ppm, preferably from 0.5 to 25, most preferably from 1 to 10 ppm in the aqueous system being treated by the synergistic combination (A), (B) and (C) of the present invention. For example, the organic sulfonamide stabilizing agents of the present invention will be added to the aqueous system at a concentration of between 0.5 and 25 ppm, wherein the aqueous system is at a pH of from 6 to 10, at a temperature of from 10° to 80° C. (Centigrade), and having a chlorine and/or bromine concentration of between about 0.1 and 50 ppm, and usually from about 0.1 to 10 ppm.

In another embodiment of the present invention, a method is provided for inhibiting the formation deposition and adherence of scale forming salts in an aqueous system having a pH of at least 8.5 and a calcite saturation level of at least 100 times the solubility limit of calcium as calcite, comprising adding to said aqueous system an effective amount of combination of (A) an amount to establish a concentration of at least about 1.0 mg/L of a polyether polyamino methylene phosphonate of the formula:

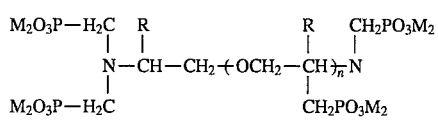

where n is an integer or fractional integer which is, or on average is, from about 2 to about 12, inclusive; M is hydrogen or a cation of an alkali metal salt; and each R may be the same or different and is independently selected from hydrogen and methyl; adding (B) an amount sufficient to establish a concentration of at least about 2.0 mg/L of a terpolymer comprising the monomers of acrylic acid, sulfophenomethallyl ether and maleic acid, wherein said terpolymer has a weight average molecular weight in the range from about 4,000 to 10,000; and adding (C) an amount sufficient to establish a concentration of at least about 1.0 mg/L of a hydroxyphosphonoacetic acid. Preferably this method includes wherein for the polyether polyamino methylene phosphonate, as described herein, M is hydrogen, each R is methyl, and n is from about 2 to 4, and more preferably wherein n is about 2.6.

In another embodiment of the method of the present invention, a method is provided wherein the terpolymer (B) is about 84 weight average molecular weight percent acrylic acid, about 8 weight average molecular weight sulfophenomethallyl ether, and about 8 weight average molecular weight percent maleic acid.

Preferably the method of the invention, as described herein, includes wherein the ratio of (A):(B):(C) of the synergistic combination of the aqueous system ranges from about 1:2:1 to about 5:2:1.

In a most preferred embodiment of the method of this invention, as described herein, the method provides from adding the synergistic combination (A), (B) and (C) to the aqueous system having a calcite saturation level of at least 150 times the solubility limit of calcium as calcite wherein the (A) polyether polyamino methylene phosphonate is present in a concentration of at least about 6.0 mg/L, the (B) terpolymer is present in a concentration of at least about 4.0 mg/L, and the (C) hydroxyphosphonoacetic acid is present in a concentration of at least about 2.5 mg/L.

Another embodiment of the present invention includes the method, as described herein, that further includes adding a stabilizer, as described hereinbefore, to the aqueous system for preventing decomposition of the synergistic combination, and more particularly for preventing the decomposition of the polyether polyamino methylene phosphonate (A).

Another embodiment of the present invention provides for a method, as described herein, that further includes adding at least one corrosion inhibitor, as described hereinbefore. More preferably this method includes adding the corrosion inhibitor wherein it is a copper corrosion inhibitor and most preferably wherein the copper corrosion inhibitor is tolyltriazole.

The manner of addition of each component of the synergistic combination, and the other additives such as for example, the copper corrosion inhibitor, the steel corrosion inhibitor, and/or the stabilizer, as described herein, to the aqueous system of the present invention will be straightforward to a person of ordinary skill in the art. Each component of the synergistic combination may be added singularly or in any combination with each other. The order of addition of (A), (B) and (C) of the synergistic combination to the aqueous system of the present invention is not important. Similarly, the addition of the corrosion inhibitor(s), and/or stabilizer(s) to the aqueous system of this invention may be accomplished singularly or in combination with each other, and the order of addition is not critical relative to the components of the synergistic combination (A), (B) and (C) of this invention. Thus, it will be appreciated by those skilled in the art that the addition of the hereinbefore mentioned components of the synergistic combination (A), (B) and (C) and the hereinbefore mentioned additives may be accomplished by adding each of (A), (B), (C), corrosion inhibitor(s), or stabilizer(s), individually as a single additive to the aqueous system, or in any combination of two or more of the following (A), (B), (C), corrosion inhibitor or stabilizer to achieve the aqueous system of the present invention that includes at least (A), (B) and (C) as described herein to establish the synergistic effect taught by this invention.

Further, the manner of addition of the components (A), (B) and (C), and/or stabilizer(s), and/or corrosion inhibitor(s) of the present invention is straightforward to a person of ordinary skill in the art. Each of the components may be added in liquid form by mechanical dispensers of known design. They may also be added in diluted liquid form. As discussed hereinbefore, for example, two or more components may be combined for dispensing to the aqueous system; and these in combination may be dispensed in liquid form.

EXAMPLES

The following examples demonstrate the invention in greater detail. These examples are not intended to limit the scope of the invention in any way. In the examples the following products were used:

TRC is a polyether polyamino methylene phosphonate (A), as set forth in the formula described hereinbefore, wherein both R's are methyl, M is hydrogen, n is on average 2.6 and the resultant weight average molecular weight is about 600. TRC is commercially available for use in the aqueous system, as described herein, from Calgon Corporation, Pittsburgh, Pa., U.S.A.

Belcor 575 is hydroxyphosphonoacetic acid and is commercially available from FMC Corporation, Princeton, N.J., U.S.A.

AR540 is a terpolymer comprising about 84 weight average molecular weight percent acrylic acid, about 8 weight average molecular weight percent sulfophenomethallyl ether, and about 8 weight average molecular weight percent maleic acid. AR540 is commercially available from Alco Chemical, Chattanooga, Tenn., U.S.A.

EXAMPLES 1–14

In Examples 1–14 various formulations were tested for their effectiveness in improving the inhibition of the formation, deposition and adherence of calcium carbonate ($CaCO_3$) and calcium phosphate ($CaPO_4$) at pH 8.5, and calcite saturation at about 100 times the solubility limit of calcium as calcite. In order to demonstrate the improved scale inhibitor performance of the aqueous system of the present invention, the following procedure was used:

Scaling water containing 150 mg/L of $Ca^{+2}$ and 600 mg/L of alkalinity as calcium carbonate and about 2 mg/L of orthophosphate at a pH of about 8.5 and 60° Centigrade to achieve a calcite saturation of about 100× was used to evaluate scale inhibition performance of test solutions (Examples 1–14) over a 24 hour period. Test solutions were analyzed by withdrawing 10 grams of test solution and adding to it an appropriate container through a 0.2 micron filter and titrating for calcium by the Schwarzenbach method and $PO_4^{3-}$ by using the spectrophotometric method known by those skilled in the art, and calculating the percent inhibition by methods known by those skilled in the art. The make-up of the test solutions of each example is set forth in Table 1. Table 1 also shows the results of the above scale inhibiting activity evaluations over a time period of 24 hours, wherein the percent (%) inhibition of calcium carbonate ($CaCO_3$) and calcium phosphate ($CaPO_4$) was calculated at 24 hours for each example.

TABLE 1

| Example | AR540, mg/L | Belcor-575, mg/L | TRC mg/L | % Inhibition $CaCO_3$ | $CaPO_4$ |
|---|---|---|---|---|---|
| 1 | 2 | — | — | 37 | 69 |
| 2 | 2 | — | — | 35 | 72 |
| 3 | — | 1 | — | 40 | 17 |
| 4 | 2 | — | 1 | 92 | 89 |
| 5 | 2 | 1 | — | 53 | 80 |
| 6 | — | 1 | 1 | 100 | 50 |
| 7 | 2 | 1 | 1 | 100 | 100 |
| 8 | — | — | 6 | 100 | 42 |
| 9 | — | — | 25 | 100 | 100 |
| 10 | 4 | — | — | 69 | 100 |
| 11 | — | 2.5 | — | 61 | 27 |
| 12 | 4 | — | 6 | 100 | 100 |
| 13 | 4 | 2.5 | — | 76 | 100 |
| 14 | — | 2.5 | 6 | 100 | 44 |

Examples 1 through 3, Table 1, show that each component of the synergistic combination of the aqueous system of the present invention when used individually in an aqueous system having scaling water containing 150 mg/L $Ca^{+2}$, 600 mg/L of alkalinity as calcium carbonate and about 2 mg/L orthophosphate at a pH of about 8.5, as described hereinbefore, do not achieve sufficient inhibition of calcium carbonate and calcium phosphate scale at a calcite saturation at about 100 times (100×) the solubility limit of calcium as calcite.

Examples 4 through 6 show that when a combination of any two components of the synergistic combination of the present invention are used together, inhibition of both calcium carbonate and calcium phosphate is not achieved. Example 7 shows that the synergistic combination of the present invention wherein 1 mg/L of TRC (polyether polyamino methylene phosphonate (A) of the formula, as described herein), 1 mg/L of Belcor 575 (hydroxyphosphonoacetic acid), and 2 mg/L AR540 (terpolymer as described herein) effectively inhibits 100% of the formation of both calcium carbonate and calcium phosphate scales.

Examples 8, 10 and 11 show that increasing the concentration of employing a single component alone of the synergistic combination of the present invention does not achieve sufficient inhibition of both calcium carbonate and calcium phosphate scale formation. Example 9 shows that use of TRC alone at a concentration of 25 mg/L inhibits 100% of both calcium phosphate and calcium carbonate scales, however, achieving a concentration of at least 25 mg/L of TRC is expensive, and thus a disadvantage to improving the operating costs of the process using the aqueous system with TRC alone.

Example 12 shows that employing a concentration of 4 mg/L of AR540 and 6 mg/L of TRC effectively inhibits 100% of the formation of calcium carbonate and calcium phosphate scale. While the synergistic combination set forth in Example 12 effectively inhibits the scale formation, it is less economical to employ in a process having the aqueous system of the present invention when compared to the synergistic combination of the present invention described in Example 7.

Examples 13 and 14 show that employing higher concentrations of either a combination of AR540 and Belcor-575, or a combination of Belcor-575 and TRC do not achieve sufficient inhibition of both the formation of calcium carbonate and calcium phosphate scales in the aqueous system.

EXAMPLES 15–22

In Examples 15 through 22, various formulations were tested for their effectiveness in improving the inhibitor of the formation, deposition and adherence of calcium carbonate and calcium phosphate. In order to demonstrate the improved scale inhibition performance of the aqueous system of the present invention, the following procedure was used:

Scaling water containing 150 mg/l of $Ca^{+2}$ and 600 mg/L of alkalinity as calcium carbonate and about 2 mg/L of orthophosphate at pH of about 8.8 and 60° Centigrade to achieve a calcite saturation of about 150' was used to evaluate scale inhibition performance of test solutions (Examples 15–22) over a 24 hour period. Test solutions were analyzed by withdrawing 10 grams of test solution and adding it to an appropriate container through a 0.2 micron filter and titrating for calcium by the Schwarzenbach method and $PO_4^{3-}$ by using the spectrophotometric method known by those skilled in the art and calculating the percent inhibition by methods known by those skilled in the art. The make-up of the test solutions of each example (Examples 7–22) is set forth in Table 2. Table 2 also shows the results of the above scale inhibitor activity evaluations over a time period of 24 hours, wherein the percent (%) inhibition of calcium carbonate and calcium phosphate was calculated at 24 hours for each example.

TABLE 2

| Example | AR540, mg/L | Belcor-575, mg/L | TRC mg/L | % Inhibition CaCO₃ | % Inhibition CaPO₄ |
|---|---|---|---|---|---|
| 15 | — | — | 6 | 87 | 27 |
| 16 | 4 | — | — | 60 | 49 |
| 17 | — | 2.5 | — | 69 | 29 |
| 18 | 4 | — | 6 | 89 | 80 |
| 19 | 4 | 2.5 | — | 80 | 39 |
| 20 | — | 2.5 | 6 | 97 | 11 |
| 21 | 2 | 1 | 1 | 65 | 45 |
| 22 | 4 | 2.5 | 6 | 100 | 100 |

Table 2 shows the results obtained for various formulations' abilities to inhibit the formation of calcium carbonate and calcium phosphate scales in an aqueous system having a pH of at least about 8.5 and a calcite saturation of at least 150 times the solubility limit of calcium as calcite (150×).

Examples 15–17 and Examples 18–20 of Table 2 demonstrate that when a single component of the synergistic combination of the aqueous system of the instant invention is employed alone, or a combination employing any two components of the synergistic combination of this invention, respectively, are employed in the aqueous system having a calcite saturation of 150×, effective inhibition of both calcium carbonate and calcium phosphate scales are not achieved.

Examples 21 and 22, Table 2, show that a concentration of at least a 4 mg/L AR540, 2.5 mg/L Belcor-575, and 6 mg/L TRC of the synergistic combination of the aqueous system of the present invention is required to inhibit 100% of both calcium carbonate and calcium phosphate scales in an aqueous system having a calcite saturation of at least 150×.

EXAMPLES 23–24

In Examples 23 and 24, formulations were tested for effectiveness in providing 100% deposit control for both calcium carbonate and calcium phosphate and for providing protection against corrosion in scaling water containing 200 mg/L of $Ca^{2+}$ and about 4 mg/L of orthophosphate at pH of about 8.5 and 60° C. to achieve a calcite saturation at about 240 times the solubility limit of calcium as calcite. The analysis method set forth herein under Examples 1–14 was then followed. The makeup of the formulation for Example 23 contained about 8 mg/L TRC, and the makeup of the formulation for Example 24, an example of the synergistic combination of the instant invention, contained about 8 mg/L TRC, 6 mg/L of component (B) of the instant invention, 4 mg/L of component (C) of the instant invention, 5 mg/L of the stabilizer monethanolamine, and 2 mg/L of the copper corrosion inhibitor tolyltriazole.

Corrosion test procedures were carried out in an 8 L vessel fitted with a heater having a temperature controller, a pump to circulate the water in the test apparatus, a pH monitor and controller to maintain the desired pH, and an aerator to both ensure air saturation, and to introduce carbon dioxide gas as required for pH control. The steel coupon specimens for the test were composed of 1010 carbon steel (UNS designation G10100), and these were immersed in the water of the test apparatus. Corrosion penetration rates in mils per year (mpy) were determined gravimetrically after 7 days by the standard ASTM-G1-88 method. The composition of the water used in the test apparatus was as follows:

| Ion | Conc. (mg/L) |
|---|---|
| Ca | 200 |
| Mg | 40 |
| Cl | 416 |
| SO₄ | 1025 |
| SiO₂ | 14 |
| Alkalinity as CaCO₃ | 498 |

Table 3 shows the results of the scale deposit evaluation over a time period of 24 hours wherein the percent (%) inhibition of calcium carbonate and calcium phosphate was calculated at 24 hours for each example.

TABLE 3

| Example | Deposit Control as % Inhibition CaCO₃ | Deposit Control as % Inhibition CaPO₄ | Corrosion Rate (mpy) |
|---|---|---|---|
| 23 | 80 | 80 | 15 |
| 24 | 100 | 100 | 0.7 |

It will be appreciated by those skilled in the art that the data of Table 3 demonstrates that the aqueous system containing the synergistic combination as disclosed by the instant invention provides a dramatic improvement in corrosion rate over treatment known in the art.

From the above data, it will be appreciated by those skilled in the art that the methods and aqueous system of the present invention comprising the synergistic combination of the (A) polyether polyamino methylene phosphonate, as described herein, the (B) terpolymer, as described herein, and the (C) hydroxyphosphonoacetic acid, as described herein, significantly improve the inhibition of both calcium carbonate and calcium phosphate scales in an aqueous system having a calcite saturation level of at least 100 times the solubility limit of calcium as calcite, over conventional known compositions. Further, the present invention provides an economical resolution to the problem of inhibiting 100 percent of both calcium carbonate and calcium phosphate scale formation in an aqueous system not heretobefore possible.

Whereas particular embodiments of the instant invention have been described for the purposes of illustration, it will be evident to those skilled in the art that numerous variations and details of the instant invention may be made without departing from the instant invention as defined in the appended claims.

What is claimed is:

1. A method of inhibiting the formation, deposition and adherence of scale forming salts including calcium phosphate in an aqueous system having a pH of at least 8.5 and a calcite saturation level of at least 100 times the solubility limit of calcium as calcite, comprising adding to said aqueous system an effective synergistic amount of a combination of (A) an amount to establish a concentration of at least about 1.0 mg/L, of a polyether polyamino methylene phosphonate of the formula:

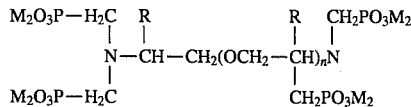

where n is an integer or fractional integer which is, or on average is, from about 2 to about 12, inclusive; M is hydrogen or a cation of an alkali metal salt; and each R may be the same or different and is independently selected from hydrogen and methyl; (B) an amount sufficient to establish a concentration of at least about 2.0 mg/L of a terpolymer comprising the monomers of acrylic acid, sulfophenomethallyl ether and maleic acid, wherein said terpolymer has a weight average molecular weight in the range from about 4,000 to 10,000; and (C) an amount sufficient to establish a concentration of at least about 1.0 mg/L of a hydroxyphosphonoacetic acid.

2. The method of claim 1 including wherein for said (A) polyether polyamino methylene phosphonate, M is hydrogen, each R is methyl, and n is from about 2 to 4.

3. The method of claim 2 including wherein n is about 2.6.

4. The method of claim 1 including wherein said aqueous system is a cycled up cooling tower.

5. The method of claim 1 including wherein said (B) terpolymer is about 84 weight average molecular weight percent acrylic acid, about 8 weight average molecular weight percent sulfophenomethallyl ether, and about 8 weight average molecular weight percent maleic acid.

6. The method of claim 1 including wherein the weight ratio of (A):(B):(C) ranges from about 1:2:1 to about 5:2:1.

7. The method of claim 1 including adding said synergistic combination comprising said (A), (B) and (C) to said aqueous system wherein said (A) polyether polyamino methylene phosphonate is present in a concentration of at least about 6.0 mg/L, said (B) terpolymer is present in a concentration of at least about 4.0 mg/L, and said (C) hydroxyphosphonoacetic acid is present in a concentration of at least about 2.5 mg/L, wherein said aqueous system has a calcite saturation level of at least 150 times the solubility limit of calcium as calcite.

8. The method of claim 1 including further adding a stabilizer to said aqueous system for preventing decomposition of said (A) polyether polyamino methylene phosphonate.

9. The method of claim 8 including wherein said stabilizer is monoethanolamine.

10. The method of claim 1 including further adding at least one corrosion inhibitor.

11. The method of claim 10 including wherein said corrosion inhibitor is a copper corrosion inhibitor.

12. The method of claim 11 including wherein said copper corrosion inhibitor is tolyltriazole.

13. The method of claim 10 including wherein said corrosion inhibitor is a steel corrosion inhibitor.

14. The method of claim 8 including further adding at least one corrosion inhibitor.

15. The method of claim 1 including wherein for said polyether polyamino methylene phosphonate, M is hydrogen, each R is methyl, and n is about 2.6, and further including adding a stabilizer to said aqueous system, and adding a corrosion inhibitor to said aqueous system.

16. The method of claim 15 including wherein said stabilizer is monoethanolamine.

17. The method of claim 16 including wherein said corrosion inhibitor is a copper corrosion inhibitor.

18. The method of claim 16 including wherein said copper corrosion inhibitor is tolyltriazole.

* * * * *

UNITED STATES PATENT AND TRADEMARK OFFICE
CERTIFICATE OF CORRECTION

PATENT NO. : 5,593,595

DATED : January 14, 1997

INVENTOR(S) : Jasbir S. Gill

It is certified that error appears in the above-identified patent and that said Letters Patent is hereby corrected as shown below:

Column 5, lines 1 and 47, the formula should read as follows:

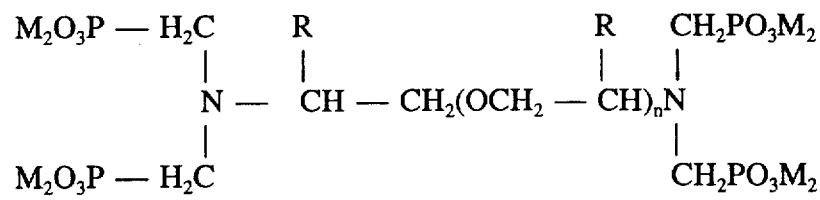

UNITED STATES PATENT AND TRADEMARK OFFICE
CERTIFICATE OF CORRECTION

PATENT NO. : 5,593,595

DATED : January 14, 1997

INVENTOR(S) : Jasbir S. Gill

It is certified that error appears in the above-identified patent and that said Letters Patent is hereby corrected as shown below:

Column 6, lines 5 and 38, the formula should read as follows:

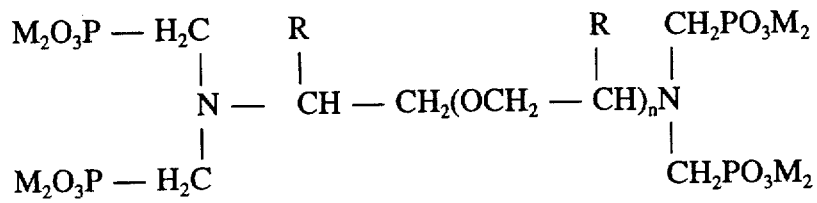

Column 7, line 37, the formula should read as follows:

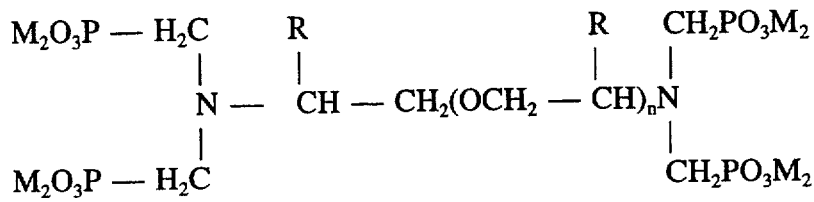

Column 16, line 10, the formula should read as follows:

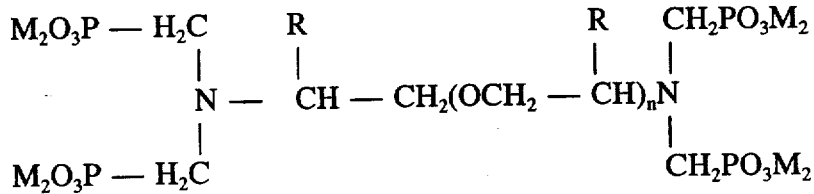

UNITED STATES PATENT AND TRADEMARK OFFICE
CERTIFICATE OF CORRECTION

PATENT NO. : 5,593,595
DATED : January 14, 1997
INVENTOR(S) : Jasbir S. Gill

It is certified that error appears in the above-identified patent and that said Letters Patent is hereby corrected as shown below:

Claim 1, column 21, line 35, the formula should read as follows:

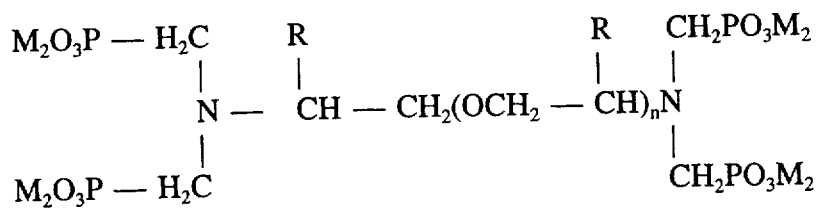

Signed and Sealed this

Twenty-third Day of December, 1997

*Attest:*

BRUCE LEHMAN

*Attesting Officer*  *Commissioner of Patents and Trademarks*